Patented Sept. 12, 1939

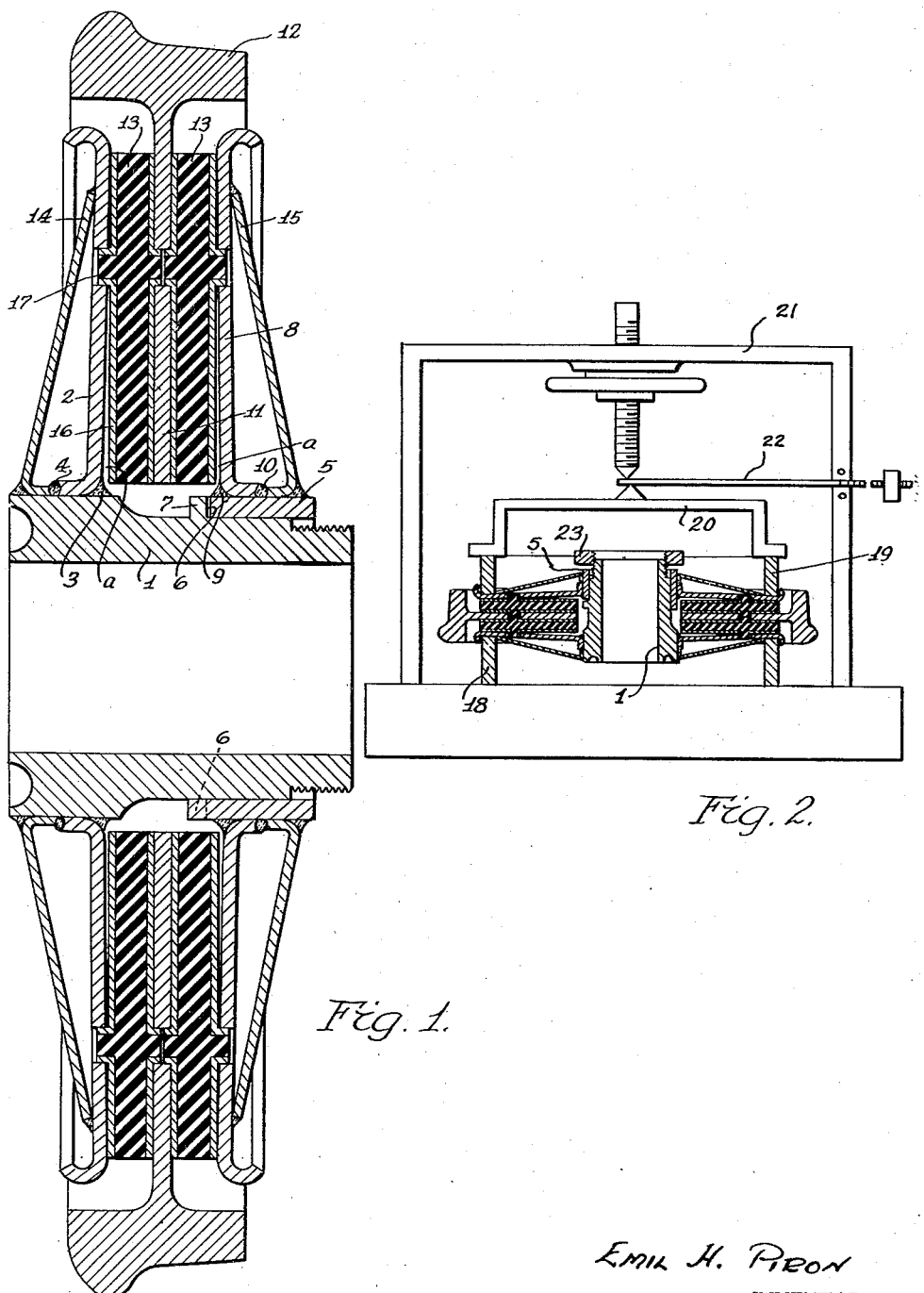

2,172,641

UNITED STATES PATENT OFFICE 2,172,641

WHEEL AND SPRINGING ELEMENT THEREFOR

Emil H. Piron, New York, N. Y., assignor to Transit Research Corporation, New York, N. Y., a corporation of New York Application February 26, 1937, Serial No. 127,856

9 Claims. (Cl. 295—11)

This invention relates to resilient wheels of the type wherein the hub portion is supported from the tread surface through elastic shear elements.

The elastic shear elements are surface bonded at opposite faces to discs of metal having dowels integral therewith. Main plate members radiate outwardly from the wheel hub and inwardly from the tread surface, the plate member of the tread surface residing between the hub plate members and separated therefrom by the elastic elements. Each of the plate members is provided with dowel holes to receive the dowels of the discs. When the hub plates are urged toward each other the elastic elements are placed under compression and the friction between the plates and their discs plus the dowels assume all radial and driving load functions. Since the compression imposed on the elastic elements by the main plate members is severe there is a springing or dishing of the plate members with the result that the stresses in the elastic elements are not uniform. It is, therefore, a principal object of this invention to provide an alternate plate and elastic element design which will counteract this dishing effect.

In wheels of this general type the connection of the elastic elements to the load imposing and load receiving member requires a fitting of the complete length of the dowels in their holes together with frictional engagement of the discs with their plates such as can be obtained only by placing the elastic elements under very substantial compression. Since it is impossible to manufacture the elements commercially to exact dimensions the amount of compression imposed during assembly cannot be measured by the distance between the main plates. It is another object of this invention to teach that a predetermined or minimum compression must be imparted to these elements and to illustrate a manner of imposing thereon a known amount of compression.

Other objects and advantages will become hereinafter more fully apparent as reference is had to the accompanying drawing wherein my invention is illustrated by way of example and in which:

Fig. 1 is a transverse diametric section through a wheel constructed in accordance with this invention, and Fig. 2 is a diagrammatic view showing the imposition of pressure during assembly of the wheel.

I indicates a wheel hub having a main plate member 2 radiating therefrom and welded thereto at 3 and 4. Slidable on the hub I is a collar 5 having clutch teeth 6 engaging clutch teeth 7 on the hub and having a main plate member 8 radiating therefrom. The member 8 is welded to the collar at 9 and 10. A third main plate member 11 having an internal diameter substantially larger than the outside diameter of the hub I carries the tire 12 and resides between the members 2 and 8, being separated therefrom by cylindrical elastic shear elements 13 having approximately the same internal diameter as that of the plate 11 and having an outside diameter substantially less than that of the plates 2 and 8.

In order to brace the plates 2 and 8 I provide conical plates 14 and 15 welded to the hub I and collar 5 respectively and welded to their respective plate members 2 and 8 at their large bases. The main plates each tend to dish between the outer circles of contact with the cones 14 and 15 and the welds 3 and 9. In order to counteract this dishing tendency the inside face of each plate 2 and 8 is slightly conical with the cone in each instance being in the same direction as that of its bracing plate. In other words, the two cones are nested. Thus, viewed in cross-section, when the parts of the wheel are assembled prior to imposing pressure on the elastic elements 13 the plates 2 and 8 form an angle "a" with the adjacent surfaces of the elements 13. When substantial compression is imparted to the elements 13 by urging the plate 8 toward the plate 2 the area of the plates at the region of bracing by the cones 14 and 15 receives the greatest stresses. Since the widest portion of the elastic element extends outwardly of the circle of contact of the bracing plates with result that when full compression is imposed on the shear elements there is no substantial tendency for the plates 2 and 8 to become dished.

Each element 13 is surface bonded at each flat face to a disc 16 having dowels 17 for engagement with dowel holes in each plate 2 and 8. The amount of pressure which must be imposed to take substantially all of the dish out of the plates 2 and 8 is based upon the amount of pressure necessary to retain the dowels 17 in their holes and to retain the disc 16 in frictional engagement with the plates. Present practice of street car operation has demonstrated that, for the weights now carried, the minimum compression pressure on the elements should be about 10,000 pounds per wheel. In order to impose this or any given pressure, the wheel is placed on suitable supports 18, as illustrated in Fig. 2. Bars or a ring 19 is then placed on the upper plate for contact by a cross member 20 which in turn is subjected to action of a beam press 21. When pressure is applied by actuation of the press, the elastic elements are compressed by an amount which can be read from the press arm 22. When the pressure reaches the amount specified, the nut 23 which is threaded on the hub 1 and which contacts the collar 5 is screwed onto the hub by hand until it firmly engages the collar 5 whereupon the press pressure is relieved and the wheel removed therefrom.

What I claim is:

1. In a wheel, a hub having plates radiating therefrom, a tire carrying plate radiating inwardly from a tire and residing between the first named plates, elastic shear elements supporting said hub and said first named plates from said tire carrying plate, one of said first named plates being slidable on said hub to impose or relieve pressure on said shear elements, the adjacent faces of said first named plates and said shear elements being relatively inclined prior to the imposition of pressure on said elements, and said plates being substantially parallel after imposition of pressure on said elements.

2. In a wheel, a hub having plates radiating therefrom, a tire carrying plate radiating inwardly from a tire and residing between the first named plates, elastic shear elements supporting said hub and said first named plates from said tire carrying plate, one of said first named plates being slidable on said hub to impose or relieve pressure on said shear elements, the inside surfaces of said first named plates each being slightly conical prior to imposition of pressure on said shear elements, and said plates being substantially parallel after imposition of pressure.

3. In a wheel, a hub having plates radiating therefrom, a tire carrying plate radiating inwardly from a tire and residing between the first named plates, elastic shear elements supporting said hub and said first named plates from said tire carrying plate, one of said first named plates being slidable on said hub to impose or relieve pressure on said shear elements, the adjacent faces of said first named plates and said shear elements being relatively inclined prior to the imposition of pressure on said elements with the angle formed thereby diverging toward said hub, and said plates and shear elements being substantially parallel after imposition of pressure on said elements.

4. In a wheel, a hub having substantially parallel plates radiating therefrom, a tire carrying plate radiating inwardly from a tire and residing between the first named plates, and elastic shear elements supporting said hub and said first named plates from said tire carrying plate, one of said first named plates being slidable on said hub to impose or relieve pressure on said shear elements, the inside surfaces of said first named plates each being slightly conical with the large bases thereof initially engaging said elements as said plates are urged toward each other.

5. In a wheel, a hub having two dual relatively slidable plate assemblies radiating therefrom, a tire having a plate radiating inwardly therefrom and residing between the two assemblies, and elastic elements between said plate and each of said assemblies supporting said hub in resilient shear, said plate assemblies each comprising two conical plate members integrally secured together.

6. In a wheel, a hub having two dual relatively slidable plate assemblies radiating therefrom, a tire having a plate radiating inwardly therefrom and residing between the two assemblies, and elastic elements between said plate and each of said assemblies supporting said hub in resilient shear, said plate assemblies each comprising two nested conical plate members with the slope of the inner one thereof being relatively very small.

7. In a wheel, a hub having two dual relatively slidable plate assemblies radiating therefrom, a tire having a plate radiating inwardly therefrom and residing between the two assemblies, and elastic elements between said plate and each of said assemblies supporting said hub in resilient shear, said plate assemblies each comprising two similarly facing conical plate members, the outer member of each assembly being secured to the exterior of the inner member intermediate the length thereof whereby the larger base of the inner member is substantially larger than the large base of the outer member.

8. In a wheel, a hub having two dual relatively slidable plate assemblies radiating therefrom, a tire having a plate radiating inwardly therefrom and residing between the two assemblies, and elastic elements between said plate and each of said assemblies supporting said hub in resilient shear, said plate assemblies each comprising two conical plate members integrally secured together, the opposite faces of said elastic elements being parallel and the conicity of the inner of said plate members being slight whereby said inner members lose their conicity upon the imposition of substantial compression on said elastic elements.

9. In a wheel, a hub having two dual relatively slidable plate assemblies radiating therefrom, a tire having a plate radiating inwardly therefrom and residing between the two assemblies, and elastic elements between said plate and each of said assemblies supporting said hub in resilient shear, said plate assemblies each comprising two conical plate members integrally secured together, the opposite faces of said elastic elements being parallel and the conicity of the inner of said plate members being slight whereby said inner members lose their conicity upon the imposition of a predetermined amount of compression on said elastic elements, and a nut threadable onto said hub into engagement with one of said plate assemblies in order to maintain said predetermined amount of compression.

EMIL H. PIRON.